United States Patent [19]

Horikawa

[11] Patent Number: 4,734,578

[45] Date of Patent: Mar. 29, 1988

[54] TWO-DIMENSIONAL SCANNING PHOTO-ELECTRIC MICROSCOPE

[75] Inventor: Yoshiaki Horikawa, Hachiouji, Japan

[73] Assignee: Olympus Optical Co., Ltd., Tokyo, Japan

[21] Appl. No.: 844,167

[22] Filed: Mar. 26, 1986

[30] Foreign Application Priority Data

Mar. 27, 1985 [JP] Japan .................................. 60-62262
Mar. 27, 1985 [JP] Japan .................................. 60-62263
Mar. 27, 1986 [JP] Japan .................................. 60-62264

[51] Int. Cl.$^4$ ............................................. G01N 21/00
[52] U.S. Cl. ..................................... 250/234; 356/444
[58] Field of Search ............... 250/234, 235; 356/442, 356/444, 432; 350/6.2, 6.5, 6.6, 6.7, 6.8, 6.9

[56] References Cited

U.S. PATENT DOCUMENTS

| | | | |
|---|---|---|---|
| 3,013,467 | 12/1961 | Minsky | 356/432 |
| 3,705,755 | 12/1972 | Baer | 250/236 |
| 4,318,582 | 3/1982 | Minoura et al. | 350/6.6 |
| 4,329,012 | 5/1982 | Minoura et al. | 350/6.8 |
| 4,455,485 | 6/1984 | Hosaka et al. | 250/234 |
| 4,634,876 | 1/1987 | Ayata | 250/548 |

FOREIGN PATENT DOCUMENTS 51-26050 3/1976 Japan .

Primary Examiner—David C. Nelms
Assistant Examiner—Stephone B. Allen
Attorney, Agent, or Firm—Cushman, Darby & Cushman

[57] ABSTRACT

A scanning type optical microscope comprising a pair of light deflectors disposed between a laser light source and an objective lens for performing two-dimensional scanning of an object requiring observation by varying the incidence angle of a light entering the objective lens, and a pair of split detectors receiving a light coming from said object, wherein the light deflectors are disposed at the position of the pupil of the objective lens or at a position conjugate therewith or in their vicinity. This microscope has a high resolving power and allows an easy performance of a special microscopy and is convenient to handle. The paired detectors are arranged to be rotatable about an optical axis and allows free alteration of the orientation of differentiation of the differential observation image. A light-blocking plate can be provided within the detecting optical system for removing O-order diffraction light contained in the detection light, whereby permitting dark field microscopy at a very low cost.

21 Claims, 30 Drawing Figures

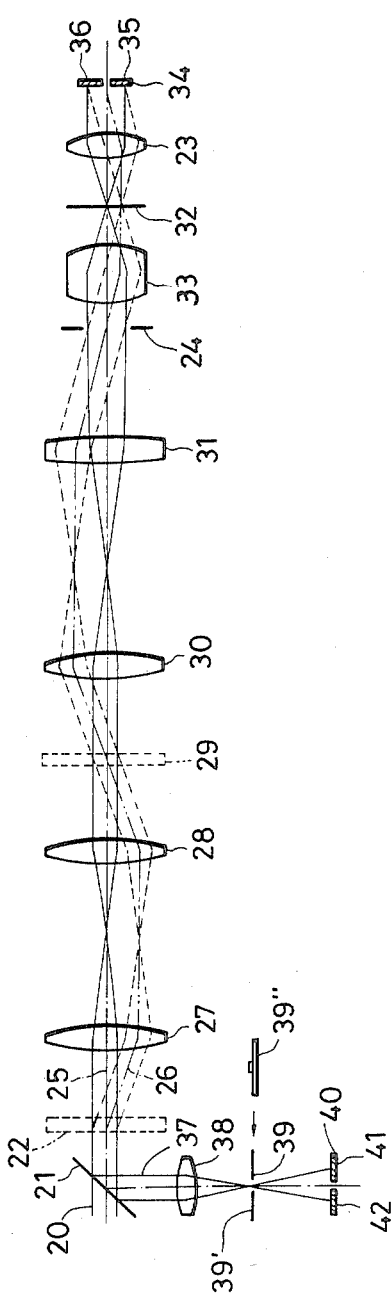
FIG. 4
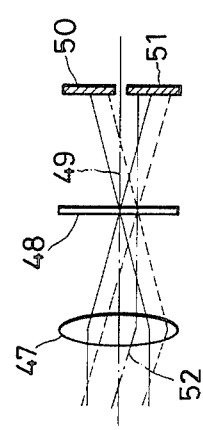
FIG. 7
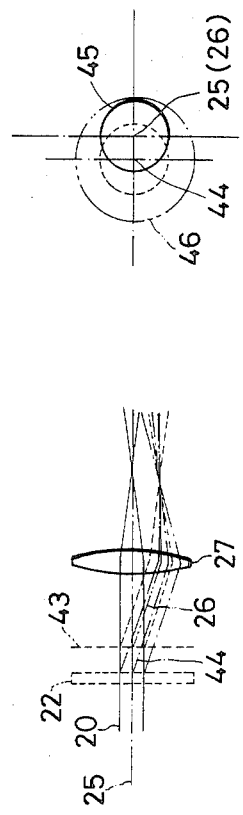
FIG. 6
FIG. 5

TWO-DIMENSIONAL SCANNING PHOTO-ELECTRIC MICROSCOPE

BACKGROUND OF THE INVENTION (a) Field of the invention

The present invention relates to a two-dimensional scanning type optical microscope.

(b) Description of the prior art

Conventional ordinary microscopse are arranged so that the entire region of observation of the sample under observation is illuminated as uniformly as possible by a light coming from a light source and by an appropriate condenser lens, and that the image of the sample is enlarged by an objective lens to be observed through an ocular lens or to be photographed. However, owing to the illumination of the entire observation region, there has tended to often develop such phenomenon as flare. In spite of various efforts which have been paid to solve these inconveniences, it has been impossible to obtain logical limit of resolution, and moreover samples of low contrast have been difficult to observe. Also, in case of the observation of a phase object by relying on, for example, differential infringement technique, the contrast of the sample under observation is also low, and thus it has been very difficult to observe its details. Also, in case a microscopic examination is performed to observe a phase object by a special microscopic technique such as the contrasting technique or the differential interference technique, or in case an observation in a dark field is conducted, it has been necessary to use specific expensive optical parts designed for the exclusive use of these respective microscopic techniques.

Therefore, in order to solve the problem that the logical limit of resolution cannot be attained because of the occurrence of such a phenomenon as flare, which is one of the drawbacks of the conventional optical microscopes, there has been proposed a microscope of a spot light projection type. This device is arranged so that a sample requiring an observation is illuminated in a spot form by the light coming from a spot light source, and that the light transmitting through the sample or the light reflected at the illuminated sample is again focused in a spot form, and that the information about the density of the image is obtained by a detector provided with a pinhole opening. This is a system almost similar to KOANANAORA system which is a photometric technique employed at present in, for example, micro-densitometry. With this system alone, there is obtained only a density information of the spot which is illuminated by the spot light. Therefore, arrangement has been provided so that, by a mechanical raster scanning of the sample two-dimensionally in X-Y directions, and by thus forming, for observation, an image on a CRT which is synchronous with said raster scanning.

Description will be made below with respect to the above-mentioned microscope based on an example described in the U.S. Pat. No. 3,013,467 Specification. FIG. 1 is a diagrammatic illustration thereof. A spot light source is formed with a light source 1 and a pin-hole 2. This spot light source is focused as a spot on a sample 4 by an objective lens 3 which has been well adjusted of its aberration, to illuminate the sample 4. Furthermore, the spot light projected onto the samples 4 is focused again as a spot onto a pin-hole 6 by a condenser lens 5 which has been well adjusted of its aberration, and the thus-formed spot light is detected by a detector 7 via the pin-hole 6. On the other hand, by a driving circuit 8, the surface of the sample 4 is mechanically scanned two-dimensionally in X-Y directions in such a way as by raster scanning for television. By indicating the image signal delivered from the detector 7 on a CRT 9 of the storage type which is synchronized with the synchronous signal coming from the driving circuit 8, it is possible to observe the image of the sample 4.

Since, in this prior art, arrangement is provided as stated above so that the sample is illuminated by a spot light and that the signal therefrom is detected by a spot-form detector, there is obtained a good image having a reduced flare as compared with the usual detectors, and also the resolution is improved. However, because this prior art represents a system of scanning which is performed by mechanically moving the sample, there have been problems such as an inconvenience in its handling. For example, samples have been limited to those which are light in weight and small in size, and also non-fixable samples such as cultured specimens encased in a decicator used in a laboratory have not been able to be observed. Furthermore, this prior art system has been difficult to apply to such a technique as flow cytometry, designed to observe different specimens successively and continuously.

Next, with respect to another problem that the above-mentioned conventional optical microscope requires exclusive optical parts and takes time and labor in making their adjustment for performing, for example, a special microscopy, there has been proposed a technique to use two detectors. This technique, like the above-described example, also is arranged so as to illuminate a sample in a spot form, and to detect the light which has transmitted therethrough or the light reflected at the sample, and to mechanically scan the sample two-dimensionally in X-Y direction in order to form the image of the sample.

Description of this microscope will be made in further detail by giving reference to FIG. 2. A spot light source 10 is focused as a spot onto a sample 4 by an objective lens 3 which has been well adjusted of its aberration, and the light which has transmitted through the sample 4 is detected by detectors 11 and 12 which are arranged to sandwich the optical axis 14. On the other hand, the sample 4 is mechanically scanned two-dimensionally in X-Y directions by a driving circuit 8 as in the case of raster scanning in television. And, the signals delivered from these detectors 11 and 12 are added or subtracted by an adder-subtractor 13 to be rendered to an image signal. By indicating this image signal on a storage type CRT 9 which is synchronized with the synchronous signal delivered from the driving circuit 8, the image of the sample can be observed. In case the signals supplied from the two detectors 11 and 12 are added together, an ordinary bright field image can be observed, whereas in case these signals are subjected to subtraction, a differential phase image of the sample 4 can be observed.

Here, description will be made of the logic of formation of a differential phase image.

For the sake of simplicity, one dimensional image is considered. The intensity of an image due to a partial coherent focusing is indicated, in general, as follows.

$$I(\lambda) = \int_{-\infty}^{\infty} C(m;p)T(m)T^*(p)\exp 2\pi j(m-p)\lambda\, dmdp$$

wherein:
T(m) represents Fourier conversion function of the transmittivity of an object; and
C(m;p) corresponds to the transfer function of the optical system.

When the sensitivity of the detectors are assumed to be $D(\xi)$, and when the pupil function of the optical system is assumed to be $P(\xi)$, then C(m;p) is indicated by:

$$C(m;p) = \int_{-k}^{k} D(\xi)P(\lambda fm - \xi)P^*(\lambda fp - \xi)d\xi$$

wherein:
f represents the focal distance of the system; and
$\lambda$ represents the wavelength of the light.

Here, $D(\xi)$ is assumed to be that of split detectors, and the difference in the signals will be considered, and we get $$C(m;o) = \frac{2}{\pi}\left\{\cos^{-1}\frac{\tilde{m}}{2a} - \frac{\tilde{m}}{2a}\sqrt{1-\left(\frac{\tilde{m}}{2a}\right)^2} - \cos^{-1}\frac{\tilde{m}}{a} - \frac{\tilde{m}}{a}\sqrt{1-\left(\frac{\tilde{m}}{a}\right)^2}\right\}$$

$\tilde{m} < a$ $$= \frac{2}{\pi}\left\{\cos^{-1}\frac{\tilde{m}}{2a} - \frac{\tilde{m}}{2a}\sqrt{1-\left(\frac{\tilde{m}}{2a}\right)^2}\right\}$$

$\tilde{m} > a$ wherein:
a represents the radius of the pupil; and
$m = \lambda fm$.

In case the object has a weak contrast, it is only necessary to consider only C(m;p). Accordingly, unless the effect of diffraction is considered, there will be obtained such a relation as $$C(m;p) = m + p.$$

At such a time, we let $$I(\lambda) = 2\, t^2(\lambda)\frac{d\phi(\lambda)}{d\lambda}$$

and we will note that $I(\lambda)$ contains the differentiation information $$\frac{d\phi\lambda}{d\lambda}$$

of the phase $\phi(\lambda)$. Since $t(\lambda)$ represents amplitude, it will be noted that, by dividing the difference, signal of the detectors by the sum signal ($=t^2$(intensity)) of the detectors, there is obtained the information concerning differential phase.

As will be noted, in the case of the above-described prior art example, there can be performed a special microscopy which is called differential image observation only by a changeover of the connection of a switch without requiring the replacement of parts and making their adjustment. However, because there are used two detectors and moreover because they are fixed, not only there has arisen the inconvenience that the orientation of differentiation cannot be freely altered, but also, since the system is of the type that the sample per se is mechanically moved for the purpose of scanning, there has been the drawback that the device is inconvenient to handle.

Now, there has been proposed, in such a scanning type microscope as described above, a method of performing a dark field microscope by collecting the light reflected at the sample 4 with optical fibers arranged around the sample and by leading the collected light to a detector as shown in FIG. 3. This method is arranged so that the light emitting from a spot light source 14 such as a laser is irradiated onto a sample 16 by an objective lens 15, and that the light 17 which scatters on the sample 16 is collected by a light collector 18 comprised of optical fibers which are appropriately arranged around either the sample 16 or the objective lens 15, and that the collected light is detected by a detector 19. According to this method, however, in case a dark filed microscopy is to be performed it is necessary to use an expensive optical fibers so that there is the problem that the device becomes costly.

SUMMARY OF THE INVENTION

It is, therefore, a primary object of the present invention to provide a scanning type microscope which has a high resolution and which permits a special microscopy in an easy manner and which is convenient to handle.

According to the present invention, the above object is attained by comprising a light source, an objective lens for collecting, onto an object, the light emitting from the light source, a light deflecting means disposed between said light source and said objective lens for scanning the surface of the object by altering the incidence angle of the light impinging onto the objective lens, and a detecting optical system containing a detector receiving the light coming from the object, and also by disposing said light deflecting means either at the position of the pupil of the objective lens or at a position conjugate with the position of the pupil of the objective lens or in their vicinity.

According to a preferred formation of the present invention, the detector is split by at least one boundary or interface, and the orientation of this interface is variable. Whereby, it is possible to freely alter the orientation of differentiation of the image in the differential observation, and thus there can be provided a scanning type microscope which is very convenient for use in practice.

According to another preferred formation of the present invention, there is provided, in the detecting optical system, a light-blocking means to eliminate 0-order diffraction light of the detection light. Whereby, it is possible to provide a scanning type microscope which is capable of performing a dark field microscopy by the adoption of a low-cost optical part such as a light-blocking plate.

According to still another preferred formation of the present invention, the detector is coupled to an image processing and indicating means which is capable of indicating the surface structure of an object requiring observation to enable a simultaneous observation of the object surface by a plurality of observers.

This and other objects of the present invention as well as the features and advantages thereof will be apparent from the following detailed description of the 5 preferred embodiments when taken in conjunction with the accompanying drawings.

BRIEF DESCRIPTION OF THE DRAWINGS

FIG. 4 is an illustration showing the optical system of an embodiment of the scanning type microscope according to the present invention.

FIGS. 5 and 6 are illustrations showing the instance wherein the light deflector is not placed at the position of the pupil in the embodiment of FIG. 4.

FIG. 7 is an illustration showing the instance wherein the detector is not placed at the position of the pupil in the embodiment of FIG. 4.

DETAILED DESCRIPTION OF THE PREFERRED EMBODIMENTS

Figure 1:
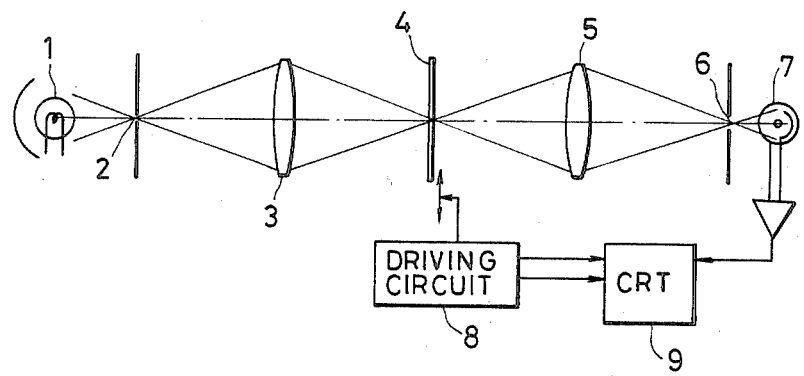
FIG. 1 is an illustration showing an example of the optical system of a conventional scanning type microscope.
Figure 2:
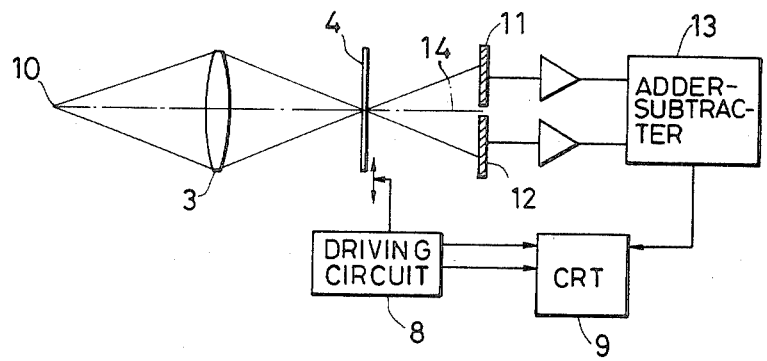
FIG. 2 is an illustration of another example of the optical system of a conventional scanning type microscope.
Figure 3:
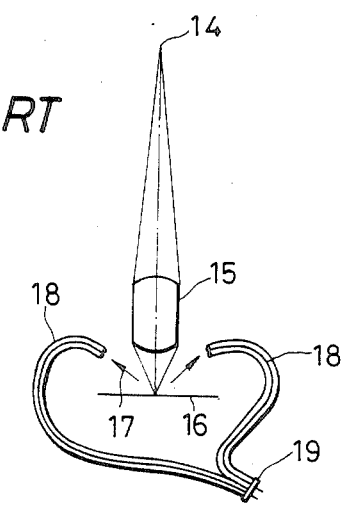
FIG. 3 is an explanatory illustration showing an example of the dark field observation technique by a conventional scanning type microscope.

The present invention will hereunder be described in further detail based on an embodiment shown in FIGS. 4 to 7.

FIG. 4 is an illustration showing the arrangement of a scanning optical system and a detector in which the pupil has been taken into consideration. A light beam 20 emitting from a laser light source passes through a beam splitter 21 and impinges onto a first light deflector 22. This light deflector 22 is disposed at a position conjugate with a pupil 24 of an objective lens 23. In case no deflection is performed, the light beam 20 advances along an optical axis 25. In case deflection is performed, i.e. in case the light beam 20 is scanned, it will be noted that, since the light deflector 22 is provided at the position of the pupil, the orientation of the light beam 20 is in agreement with an off-axial principal ray 26, and the center of the light beam 20 also coincides with the off-axial principal ray 26. Then, these light beams pass through pupil relay lenses 27 and 28 and impinge onto a second light deflector 29 which is disposed at the position of the pupil. Let us here assume that this light deflector 29 undertakes the scanning in the direction X among the two-dimensional scanning, the other light deflector 22 will perform the scanning in the direction Y. Accordingly, if a light deflector which is employed is capable of performing deflection in both directions X-Y, the use of a single light deflector is enough. The light beam which has been scanned two-dimensionally by the light deflectors 22 and 29 is caused to impinge onto the pupil 24 of the objective lens 23 by a pupil projecting lens 30 and a focusing lens 31. Since the orientation and the center of off-axial light beams which are formed by the light deflectors 22 and 29 also coincide with the off-axial principal ray 26, the off-axial light beams also impinge exactly onto the pupil 24 of the objective lens 23. And, these light beams produce, on the surface of a sample 32 by the objective lens 23, a spot light which is limited by diffraction. By performing two-dimensional scanning in X-Y directions by the light deflectors 22 and 29, the spot light performs two-dimensional scanning of the sample 32.

In case the light which has transmitted through the sample 32 is to be observed, the light is collected by a condenser lens 33 and this collected light is detected by a detector 34. This detector 34 also is provided at the position of the pupil. Accordingly, the off-axial lights are produced always at the same position, so that the effect of, for example, uneven sensitivity of the detector 34 can be prevented, and also the area for installing this detector 34 can be reduced. Furthermore, in case a differential type detection is to be performed, the detector 34 is constructed by two detectors 35 and 36, and these detectors are disposed symmetrically relative to the optical axis 25. In this case, since arrangement is provided so that even in the event of an off-axial light beam, there is established a coincidence between the center of this beam and the off-axial principal ray, the detectors 35 and 36 will be disposed symmetrically relative to the off-axial principal ray also, and thus it is possible to perform an accurate differential type detection.

Also, in case detection is performed by utilizing the reflected light coming from the sample 32, the light beam reflected from the sample 32 passes through the objective lens 23 and through its pupil 24, and after further passing through the focusing lens 31, it is focused once. This focal plane is the one that is used in ordinary optical microscopes to observe an image. Furthermore, the light beam is caused, by the pupil projecting lens 30, to return onto the light deflector 29. In this way, the reflected light beam returns to the beam splitter 21 by reversely travelling the same course which the light has followed when it impinged onto the sample, and this reflected light is derived by the beam splitter 21 to become a detection beam 37. Since this reflection beam returns by passing through the light deflectors 29 and 22, an off-axial scanning will not effect this detection beam 37 in any way. The detection beam 37 is then squeezed into a spot form by a light collecting lens 38. Therefore, by providing a pin-hole 39 at the position that the beam is squeezed into spot form, and by performing a detection by a detector 40 which is provided rearwardly of the pin-hole 39, it is possible to obtain a flare-free image of a higher resolution than offered by an ordinary microscope, in the same manner as in the above-mentioned conventional example. Also, it will be needless to say that, even without the provision of the pin-hole 39, there can be obtained an ordinary image. Also, if a black dot-like light-blocking member is provided at the position at which the light beam is squeezed into a spot form, a dark field image can be observed easily. Also, constructing the detector 40 with two detectors 41 and 42, and by disposing them at the positions at which the light beam expands so as to assume symmertical positions relative to the optical axis, it is possible to perform a differential type observation. It is needless to say that the signal supplied from the detector 40 can be made visible by an indicating means such as CRT in the same way as done in the conventional example.

Next, description will be made in detail of the need to take the pupil position into consideration in case of use of the optical system and the detecting system designed for scanning a light beam.

FIG. 5 shows the instance that, in the regions of the light deflector 22 and the pupil relay lens 27 of FIG. 4, the light deflector 22 is not provided at the position of the pupil 43. When the incident light beam 20 is deflected by the light deflector 22, the center 44 of this light beam will not become coincident with the off-axial principal ray 26 which is determined by the objective lens 23. This shows that the off-axial light beam does not impinge exactly onto the objective lens 23. In FIG. 6, reference numeral 45 represents the pupil of the objective lens 23, and it is shown there that the center of the pupil 45 indicates either the optical axis 25 or the off-axial principal ray. In this case, if the light deflector 22 is provided at a position conjugate with the pupil, the scanned off-axial light beam will coincide with the off-axial principal ray 26, and it will impinge exactly onto the pupil 45 of the objective lens 23. Contrary thereto, if the light deflector 22 is not placed at the position of the pupil, the center 44 of the light beam will not coincide with the off-axial principal ray 26, so that the expansion 46 of the light beam becomes as shown in FIG. 6 and, will not exactly impinge onto the pupil 45, and will produce an eclipse. Although, in this case, if the incident light beam is made to have a large-size beam like the expansion 46, there will arise no shortage of amount of light, still this is not suitable for the instance wherein the information of the pupil is to be utilized.

Next, description will be made of the instance wherein no detector is provided at the position of the pupil. In FIG. 7, the light beam is projected, in the form of a spot light, onto a sample 48 by an objective lens 47, and the transmitted beam of light is detected by detectors 50 and 51 which are disposed symmetrically relative to the optical axis 49. In case of the system designed for scanning a sample by moving it as in the conventional example mentioned above, the light beam will be always positioned on the optical axis, and therefore, the differential type detection can be achieved always. On the other hand, in case the light beam is scanned by a light deflector as in the present invention, there is produced an off-axial light beam. Accordingly, unless the detector is provided at the position of the pupil, the positions of the detectors 50 and 51 will not become symmetrical relative to the off-axial principal ray 52. In fact, as shown in FIG. 7, the off-axial principal ray 52 will take place on the detector 51. As a result, no accurate differential image can be obtained. From the above discussion, it will be noted that, in the scanning type optical microscope designed to scan a light beam, there is the necessity for setting the light deflector at the position of the pupil of the optical system, and for providing the detector also at the position of the pupil. By doing so, a special microscopy can be accomplished easily, and a highly resolved image can be obtained also. It should be noted here that, as will be clear from the description of the embodiment mentioned above, in case detection is performed by utilizing the reflected light, the reflection light again passes through the light deflector, so that there is no restriction to the position of the detector.

Figure 8:
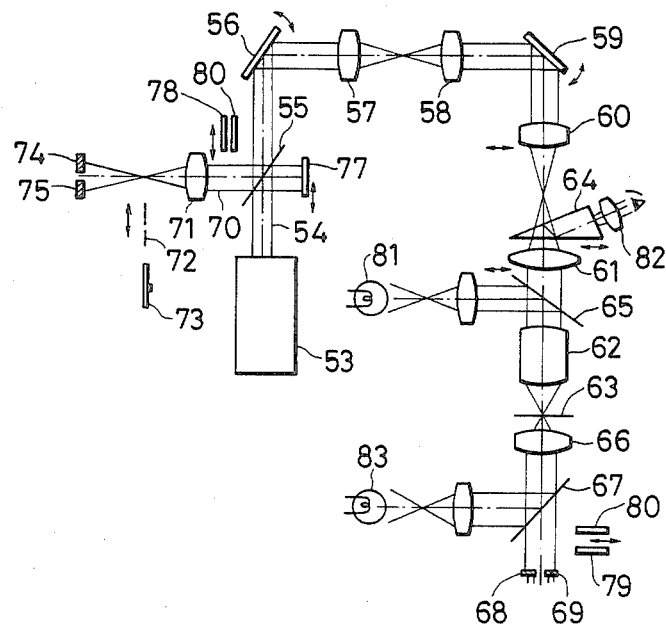
FIG. 8 is an illustration showing an example of a concrete arrangement of the scanning type microscope incorporating therein the optical system shown in FIG. 4.

Next, as a concrete example of the above-mentioned embodiment, an optical system of the scanning type microscope which allows an ordinary microscopic observation also is shown in FIG. 8. A laser beam 54 emitting from a laser light source 53 which will be described later passes through a beam splitter 55 and impinges onto a galvanometric mirror 56 which is a light deflector provided at a position conjugate with the position of the pupil of an objective lens. The laser beam 54 is deflected here, and is scanned in the direction Y. Next, by means of pupil relay lenses 57 and 58, the laser beam 54 is caused to impinge onto a galvanometric mirror 59 which is a light deflector provided at a position also conjugate with the position of the pupil of the objective lens. The laser beam 54 is again deflected here, and is scanned in the direction X. It should be noted that, in the drawing, the two galvanometric mirrors 56 and 59 are depicted as if they deflect the laser beam 54 in a same direction. In fact, however, they are arranged so that they scan the laser beam 54 in the directions Y and X, and that eventually, they are able to scan the surface of the sample two-dimensionally. The laser beam 54 which has thus been scanned two-dimensionally passes through a pupil projecting lens 60 and through a focusing lens 61, and impinges onto the pupil of an objective lens 62. And , as a result, there is produced such a laser spot on the sample 63 as is restricted by diffraction. The sample 63 is scanned two-dimensionally by this laser spot. Here, in case it is intended to perform a scanning type observation, a prism 64 for visual observation and also a beam splitter 65 intended for epi-illumination are omitted from the optical path. Otherwise, there could arise the danger that the laser beam enters the observer's eyes, and also the laser beam may become the cause of flare light. The pupil projecting lens 60 is a lens for projecting the pupil of the objective lens onto the galvenometric mirror 59. However, since the position of the pupil of the objective lens could largely vary depending on the type of the lens employed, the device is of such a construction that will allow an easy interchange of various kinds of pupil projecting lenses in order to insure that the position of the pupil of each kind of objective lens can be projected accurately onto the galvanometric mirror 59. Of course, there may be used a zoom type lens which can adjust the pupil projection distance while maintaining the position of an image constant.

Next, description will be made of the detection conducted in the light transmitting system. A laser beam which has scanned the surface of the sample 63 and has transmitted therethrough will transmit through a condenser lens 66 and a transmitting-and-illuminating beam splitter 67 intended for visual observation, and is detected by detectors 68 and 69. These detectors 68 and 69 are disposed at positions conjugate with the pupil and are symmetrical relative to the optical axis. And, by forming an image using the sum of the signals from the detectors 68 and 69, there is obtained an ordinary transmitted image, whereas if the difference between these signals is used, there is obtained a differential image. Also, through calculation of sum and difference by weighting these two small signals with an appropriate coefficient, or through the use of only one of these signals, there can be obtained a superimposed image of ordinary image and differential image, needless to say.

Next, description will be made of the function with respect to the instance wherein detection is performed by the reflection system as in the case of making an observation of an IC sample. A light beam is reflected at the surface of the sample 63 and passes through the objective lens 62, the focusing lens 61, the pupil projecting lens 60, the galvanometric mirror 59, the pupil relay lenses 58 and 57, and the galvanometric mirror 56, and returns to the beam splitter 55. In other words, the light beam returns by reversely following the same optical path through which the beam impinged onto the sample 63. A detection beam 70 which has been reflected by the beam splitter 55 is collected by a light-collecting lens 71 into the form of a spot light. By inserting a pin-hole 72 at this position and by performing detection of this collected beam by a detector positioned rearwardly thereof, a highly resolved image is obtained. Furthermore, by inserting, in place of the pin-hole 72, a black dot type light-blocking plate 73 which is formed by providing a small light-blocking black dot on a glass plate, and by thus cutting the O-order light contained in the thus-collected detection beam, there is obtained a dark field image. Also, since detectors 74 and 75 are provided symmetrically relative to the optical axis at the positions where the flux of light expands, there is obtained a differentiated image.

Figure 9:
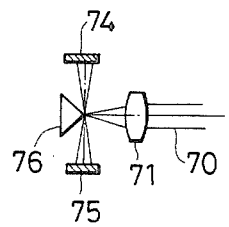
FIG. 9 is an illustration showing a modified example of the detecting system in FIG. 8.

Next, description will be made in detail with respect to the detecting unit. The detectors 74 and 75 shown in FIG. 8 are disposed at positions where the flux of light expands. The differentiated image which is obtained as a difference signal in this instance is one which concerns the phase of the sample. However, by bringing these two detectors 74 and 75 to positions where the light beam is collected by the light-collecting lens 71 and by using the two detectors 74 and 75 to perform split-detection of the light which has thus been collected into the form of a spot light, and by obtaining a difference signal therefrom, a differentiated image for the amplitude of the sample is obtained. In such a case, there is the need to make very small the distance between the two detectors 74 and 75 to split the small spot of the collected light. However, it is difficult to arrange the two detectors 74 and 75 side by side with a very small distance provided there-between, and accordingly it is desirable to use a prism mirror 76 in such a manner as shown in FIG. 9. It should be noted here that, in case photomultiplier tubes are used to serve as the detectors 74 and 75, the arrangement as shown in FIG. 9 is desirable also in case detection is performed at the position of expansion of the flux of light or at the position of the pupil.

Also, it is possible to construct an interference microscope. That is, in FIG. 8, a mirror 77 which usually is removed from the optical path is brought onto the optical path. Whereupon, a part of the laser beam 54 coming from the laser light source 53 is reflected by the beam splitter 55 and is again reflected by the mirror 77 and transmits through the beam splitter 55 and overlaps the detection beam 70 which has returned there after being reflected at the sample 63. As a result, by placing a pin-hole 72 into the optical path and by adjusting it so as to allow the above-mentioned two beams to pass through this pin-hole 72, there can be easily obtained an interference fringe.

Also, a polarizing microscope also can be constructed. That is, in FIG. 8, a beam of linearly polarized light coming from the laser light source 53 is projected onto the sample, and detection is performed by a detector via a polarizing plate 78 or 79. Also, by varying the direction of polarization of the polarizing plate 78 or 79, different state of polarization can be observed. The laser beam supplied from the laser light source 53 may be a circularly polarized light.

Also, fluorescence observation can be performed. For example, a sample which has been FITC-dyed is excited by, for example, a wavelength of 488 nm of $Ar^+$ laser, and its fluorescence can be observed. In this case, it is only necessary to insert a barrier filter 80 in the detection beam. It is needless to say that this instant method of observation may be combined with the above-mentioned various kinds of microscopy.

It should be noted here that, in FIG. 8, reference numeral 81 represents a light source for visual observation in an epi-illumination type ordinary microscope. Arrangement is provided so that a beam splitter 65 is placed in the optical path and that observation is made through a prism 64 and an ocular lens 81. Numeral 83 represents a light source for transmitted illumination. Also, by the employment of, for example, a differential infringement prism or a phase difference objective lens and a ring slit which are not shown, there can be performed a special microscopy also which is done by an ordinary microscope. Needless to say, a special microscopy can be performed at the time of a scanning type observation by using these optical parts as they are.

Figure 10:
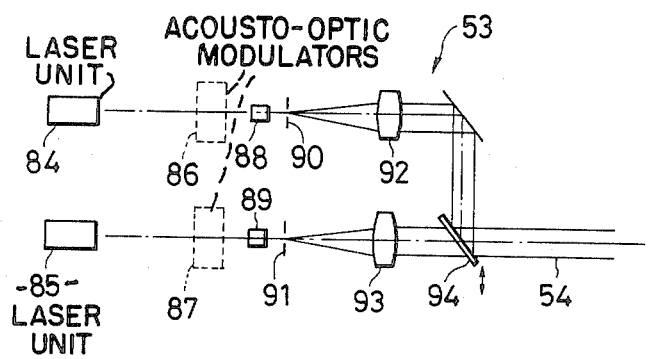
FIG. 10 is an illustration showing the optical system of a laser light source which is employed in the scanning type microscope of the present invention.

FIG. 10 is a detailed illustration of the optical system of the laser light source 53. In this case, two laser units 84 and 85 are used. Numerals 86 and 87 represent acousto-optic modulators intended to modulate the intensity of the laser light beam. Numerals 88 and 89 are light collecting lenses; 90 and 91 represent spatial filters (pinholes); and 92 and 93 denote collimators for converting the diameter of the laser beam to an appropriate size. The light beams which have passed through the collimators 92 and 93 are selected of their light paths by a changeover mirror 94, to form a laser beam 54 shown in FIG. 10. It should be noted here that, by a beam diameter variable converter lens not shown in FIG. 10, it is possible to alter the distribution of the quantity of light from uniform distribution to Gauss type distribution. Whereby, the magnitude of the focal depth at the time of making a laser beam scanning type observation can be altered.

Figure 11:
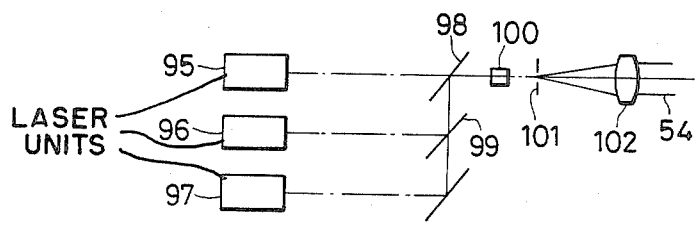
FIG. 11 is an illustration showing the optical system of a laser light source in case of obtaining a color image.

FIG. 11 shows the optical system of the laser light source in case a color image is to be obtained in the scanning type laser microscope. Numerals 95, 96 and 97 represent a blue laser light source (Ar+ laser, wavelength being 488 nm), a green laser light source (Ar+ laser, wavelength being 514.4 nm) and a red laser light source (He-Ne laser, wavelength being 633 nm), respectively. The respective laser beams emitting from these laser light sources are synthesized into one by using dichroic mirrors 98 and 99, and the latter is caused to impinge onto a spatial filter 101 via a light-collecting lens 100, and a laser beam 54 is formed by using a collimator 102. It should be understood here that, in the instance of FIG. 10, the two laser beams are synthesized into one after passing through the spatial filter 90 and 91, so that the adjustment is easy. In case of the instance of FIG. 11, however, three laser beams are synthesized first, and thereafter the resulting beam is passed through the spatial filter 101, so that the adjustment is difficult. However, by establishing coherence between these spot light sources of three colors, it is possible to prevent chromatic aberration.

Figure 12:
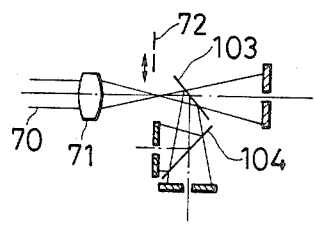
FIG. 12 is an illustration showing the detecting system in case of obtaining a color image.

FIG. 12 shows the optical system intended for obtaining R (red), G (green) and B (blue) signals of a color image by using the light sources of FIG. 11. The detection beam 70 is collected to form a spot light by using a light-collecting lens 71 so that the detection via a pinhole 72 is made feasible. Thereafter, the beam is separated into the three colors R, G and B, and each of them is detected by a detector.

Figure 13:
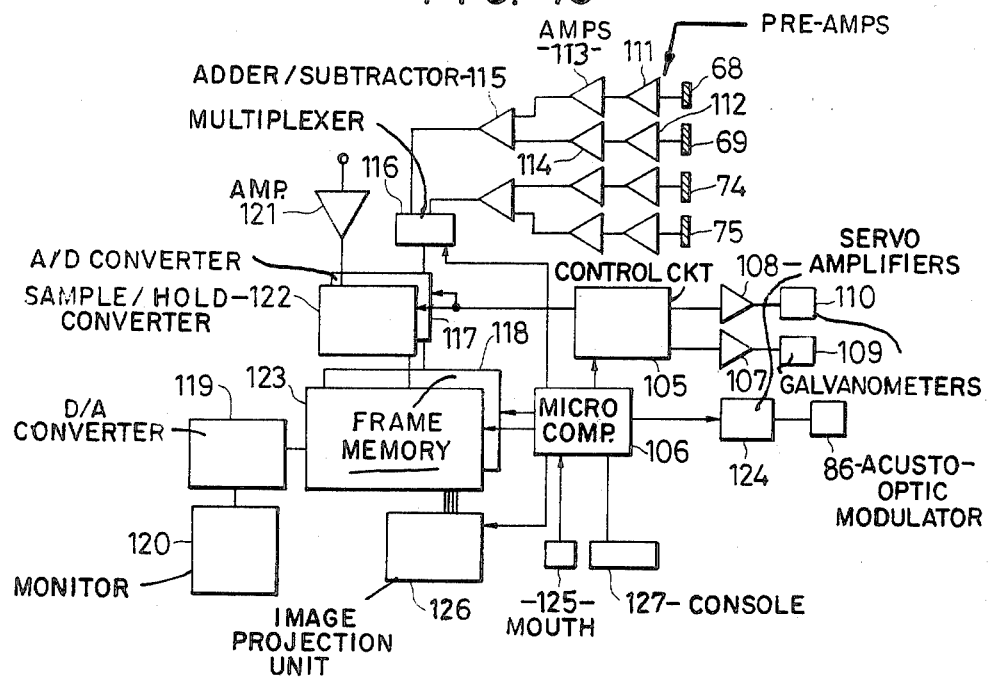
FIG. 13 is a block diagram of an electric circuitry which is suitable for the embodiment shown in FIG. 8.
Figure 14A:
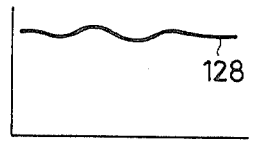
FIGS. 14A and 14B are graphs showing the intensification of contrast of an image signal.
Figure 14B:
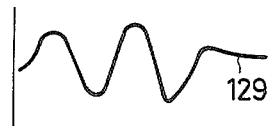

FIG. 13 shows a block diagram of an electric circuitry which uses a mirco-computer for processing images. Numeral 105 represents a galvanometer-controlling circuit which, in turn, is controlled by a micro-computer 106. It operates, via servo-amplifiers 107 and 108, two galvanometers 109 and 110 which are assigned to perform X-deflection and Y-deflection, respectively. The operation modes are such that, in addition to the raster scanning in X-Y directions for obtaining an ordinary image as one of the functions of the scanning type laser microscope, there is the scanning only in the direction X. Furthermore, there is the mode of designating coordinates for directing a laser beam only to an arbitrary point in a given image. The signals generated from the transmission diameter detectors 68 and 69 are supplied to an adder-subtractor 115 by preamplifiers 111 and 112 and also by amplifiers 113 and 114 which have been adjusted of their offset-gain. This adder-subtractor 115 performs addition or subtraction of the two signals, and inputs the result to a multiplexer 116. The signals of the detectors 74 and 75 of the reflection detecting system are inputted to this multiplexer 116 via a similar circuit. This multiplexer 116 makes selection of the signal of the tansmitting system and the signal of the reflecting system by a command of the micro-computer 106. The image signal selected by the multiplexer 116 is stored in a frame memory 118 via a sample-hold A/D converter circuit 117 which is synchronous with the galvanometer-controlling circuit 15. The stored image signal is indicated on a monitor 120 through an indicating D/A converter circuit 119. Numeral 121 represents an amplifier which is used in case an image is formed by observing the physical phenomenon produced on the sample by the scanned light beam. The output of the amplifier 121 is stored in a frame memory 123 through a sample-hold A/D converter circuit 122 and is indicated on the monitor 120 in the same way as that described above. As an example of observing the physical phenomemon produced on the sample by the scanned light beam to form an image, there is the instance to observe the optically-excited current which is generated by the incidence of light onto the PN-junction of a semiconductor or to detect a photo-acoustic wave. In these cases, however, indication can be obtained in quasi-color when superposed with an ordinary image.

Numeral 124 denotes a driving circuit of an acousto-optic modulator to drive an acousto-optic modulator 86. This driving circuit is used in such an instance that a mouth 125 is operated to arbitrarily select one point of the image being indicated on the monitor 120 by the mark indicated on this monitor 120, and that the positions of the galvanometers 109 and 110 are fixed at the coordinates of said point, and that a laser beam is irradiated momentarily onto said coordinates. Also, this circuit may be used to produce a hole by a laser beam in a fine object such as a cell. More particularly, an image is indicated by using a laser beam of a weak output intended for observation, and a location at which the hole is to be formed is designated by the mouth 125, and that an intensive laser beam is momentarily irradiated onto said location by the acousto-optic modulator. Numeral 126 represents an image processing unit connected to the frame memory, and 127 a console of the micro-computer 106. contrast image signal 128 is converted to a high-contrast image signal 129 by amplifiers 111 and 112 which can be adjusted of their offset-gain.

Figure 15A:
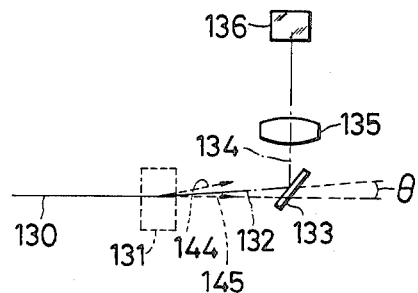
FIGS. 15A and 15B are illustrations showing the optical system of another embodiment of the scanning type microscope according to the present invention.
Figure 15B:
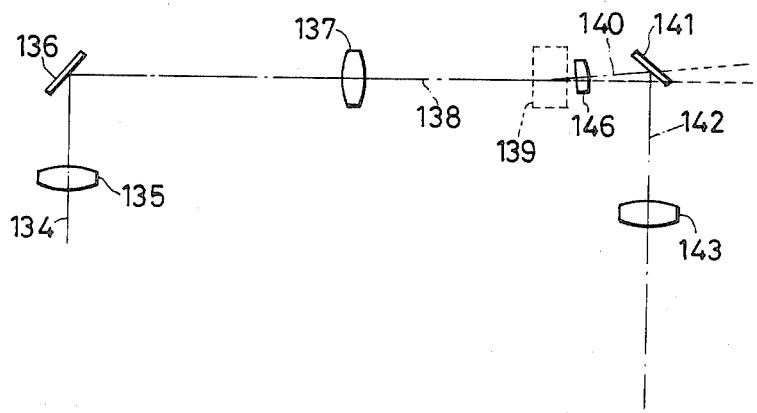

FIGS. 15A and 15B show embodiments, respectively, wherein an acousto-optic deflector is employed to serve as a light deflector. A laser beam 130 coming from a light source impinges onto an acousto-optic deflector 131 which is placed at the position of the pupil. A light beam 132 which is diffracted by the acousto-optic deflector 131 is reflected by an adjusting mirror 133 to be rendered to a beam 134 which impinges onto a pupil relay lens 135. The beam 134 reflected by a mirror 136 passes through a pupil relay lens 137 to become a beam 138. This laser beam 138 is diffracted by an acousto-optic deflector 139 which is placed at the position of the pupil to become a beam 140. This beam 140 is reflected by an adjusting mirror 141 to become a beam 142, and it impinges onto a pupil projecting lens 143. The light beam which has passed through the pupil projecting lens 143 impinges onto the pupil of an objective lens not shown, and produces a spot on the sample. Here, the laser beams illustrated at 130, 132, 134, 138, 140 and 142 indicate the center of the luminous flux which has been deflected as an on-axial light beam, and they correspond to the so-called optical axis.

Figure 16:
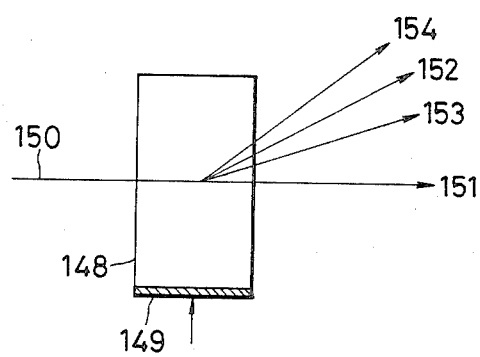
FIG. 16 is a diagrammatic sectional view of an acousto-optic deflector device.

The acousto-optic deflectors 131 and 139 each is comprises of a medium 148 for transmitting an acoustic wave and a piezo-electric device 149 as shown in FIG. 16. When a high frequency voltage (about 100 MHz) is applied to the piezo-electric device 149, a diffraction grating due to the acoustic wave is produced within the medium 148. When a laser beam 150 is directed thereto, a 0-order diffraction light 151 and a primary diffraction light 152 are produced. And, by varying the frequency of the high frequency voltage applied to the piezo-electric device, it is possible to continuously alter the orientation of the primary diffraction light from the orientation 153 to the orientation 154. This is a light deflecting method conducted by the acousto-optic deflector. Thus, let us here assume that the orientation corresponding to the optical axis is indicated at 152 and that the off-axial orientation is assumed to be indicated either at 153 or 154. As such, in FIGS. 15A and 15B, the off-axial light is deflected by the acousto-optic deflector 131 to have such orientations as shown by numerals 144 and 145 lying above and below the optical axis 132, respectively. It should be noted here that the pupil relay lenses 135, 137 and 143 correspond to the pupil relay lenses 57, 58 and 60 of FIG. 8, respectively. Also, the two acousto-optic deflectors 131 and 139 which are provided at the position of the pupil correspond to the light deflectors 22 and 29 in FIG. 4, respectively, and they scan the laser beam in the directions X and Y, respectively. As a result, the laser beam is scanned in raster form on the sample.

Viewing from the aspect of adjustment of the optical systems, it is desirable that, in case the optical systems are arranged three-dimensionally, the respective optical axes of these optical systems are either vertical or parallel. However, the diffraction light from the acousto-optic deflector 131 assumes an angle $\theta$ which is not 90° relative to the incident light 130. For example, the angle $\theta$ is about 4°. And, the diffraction angle is varied through about ±2° relative to said angle $\theta$ to scan the laser beam. Therefore, in order to hold the optical axes of the optical systems vertical, an adjusting mirror 133 desirably is provided to reflect the diffraction beam 132 and to cause the reflected diffraction beam to impinge onto the pupil relay lens 135 as a laser beam 134 which is vertical relative to the incident laser beam 130. This applies equally true to the relation between the acousto-optic deflector 139 and the adjusting mirror 141 and the relation between the laser beam 138 and the laser beam 142. Here, the lens 146 is a cylindrical lens which is arranged to compensate for the lens effect of the acousto-optic deflector 139. By the provision of an acousto-optic deflector at the position of the pupil in such a way as mentioned above, it is possible to construct a light beam scanning optical system which has taken the pupil into consideration. Whereby, it is possible to arrange a detector at the position of the pupil.

The light reflected at the sample again passed through an objective lens not shown, the pupil projecting lens 143, the acousto-optic deflector 139, the pupil relay lenses 137 and 135 and the acousto-optic deflector 131, and returns to a detecting system not shown. This detecting system is constructed in the same way as that shown in FIG. 4, and the light is branched away from the laser beam entering system by the beam splitter 21, and the resulting light is collected onto the focus 39 by the light-collecting lens 38. By providing a pin-hole plate 39' (FIG. 4) at this position, there is obtained a highly resolved image, and also by the provision of a black dot plate 39" (FIG. 4), a dark field image is obtained, and further by the split detectors 41 and 42, differential image can be obtained.

Also, the light which has transmitted through the sample is caused by the collector lens 33 to impinge onto the detectors 35 and 36 which are placed at the position of the pupil. Whereby, an ordinary image as well as a differential image can be obtained easily.

Also, by constructing the processing circuit in such a way as shown in FIG. 13, various kinds of processing become feasible. It should be noted, however, that in this case the galvanometer-controlling circuit 105 us replaced by an acousto-optic deflector-controlling circuit, and the servo-amplifiers 107 and 108 are replaced by a high frequency wave generating circuit, and the galvenometers 109 and 110 are replaced by an acousto-otpic deflector, respectively.

Description has been made already that, by splitting a collected spot-like beam by two detectors and by obtaining a difference in the output signals delivered from these respective detectors, a differential image of a sample is obtained. Description will next be made of the art that the orientation of differentiation of the differential image for observation which is to be thus obtained can be freely altered by rotating the detectors around the optical axis.

Figure 17:
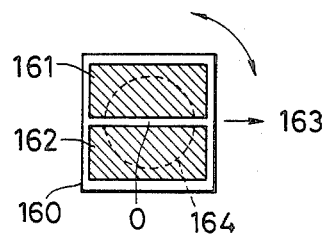
FIG. 17 is an illustration showing an example of the detector according to the present invention.

FIG. 17 shows a front view of the detector which has been described already. Here, this detector as a whole is shown by reference numeral 160, but in reality it is comprised of two photo-electric converters 161 and 162. An orientation which is normal to the orientation of the interface between these two photo-electric converters 161 and 162 represents the differential orientation of an image which is to be obtained. Numeral 164 represents the luminous flux incident to the detector 160, and the symbol O represents it optical axis. Here, the detector 106 is constructed so as to be able to rotate about the optical axis O, so that it is possible to arbitrarily select the orientation 163 of the interface between the two photo-electric converters 161 and 162. Accordingly, it is possible to freely alter the differential orientation of the differential image for observation.

Figure 18:
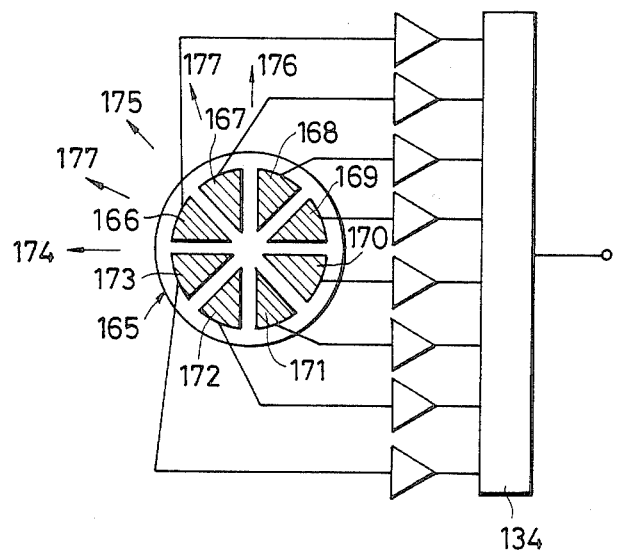
FIG. 18 is an illustration showing another example of the detector according to the present invention.

FIG. 18 shows another system of the detector. Here, a detector 165 is comprised of eight photo-electric converters 166, 167, 168, 169, 170, 171, 172 and 173. The respective detection signals are supplied, via respective pre-amplifiers, to an adder-subtractor 134 to be subjected to mathematical operation here and are rendered to an image signal. Here, the outputs of the respective photo-electric converters 166, 167, 168, 169, 170, 171, 172 and 173 are assumed to be $I_{166}$, $I_{167}$, $I_{168}$, $I_{169}$, $I_{170}$, $I_{171}$, $I_{172}$ and $I_{173}$, respectively, and a mathematical operation $(I_{166}+I_{167}+I_{168}+I_{169})-(I_{170}+I_{171}+I_{172}+I_{173})$ is conducted by the adder-subtractor 134. As a result, the substantial orientation of interface of the detector 165 becomes an orientation 174, and the orientation of the interface of a differential image becomes normal to said orientation. Also, when a mathematical operation $(I_{167}+I_{168}+I_{169}+I_{170})-(I_{171}+I_{172}+I_{173}+I_{166})$ is conducted, the orientation of the interface becomes an orientation 175. Also, by conducting a mathematical operation $(I_{168}+I_{169}+I_{170}+I_{171})-(I_{172}+I_{173}+I_{166}+I_{167})$, the orientation of interface becomes an orientation 176. Also, by a mere mathematical operation of $I_{168}-I_{172}$, the orientation of interface becomes an orientation 177, and by the mathematical operation of a mere $I_{169}-I_{173}$ will give an orientation of interface which is 177. As stated above, it is possible to easily alter the differential orientation of a differential image by an alteration of mathematical operation.

Figure 19:
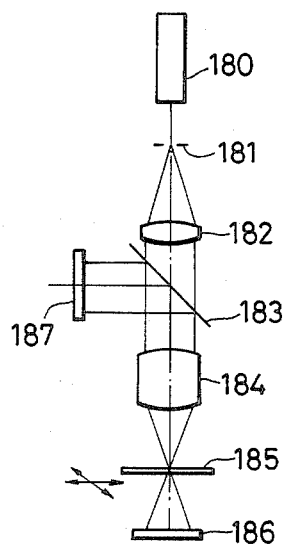
FIG. 19 is an illustration of the optical system of the microscope according to the present invention in which the detector shown in FIG. 17 is adopted.

FIG. 19 shows the optical system of an embodiment wherein the detector 160 having the arrangement shown in FIG. 17 is applied to the scanning type microscope of the kind to scan a sample by driving the supporting state carrying the sample therewith. A laser beam emitting from a laser light source 180 passes through a spatial filter 181, a beam expander 182, a beam splitter 183 and an objective lens 184, and is projected in the form of a spot light onto a sample 185. The light which has transmitted through the sample 185 is detected by a detector 186, whereas the light reflected at the sample is detected by a detector 187 via a beam splitter 183. These detectors 186 and 187 are each composed of two photo-electric converters in the same way as that shown in FIG. 17. By rotating them about an optical axis, it is possible to easily change the orientation of differentiation of the image.

Figure 20:
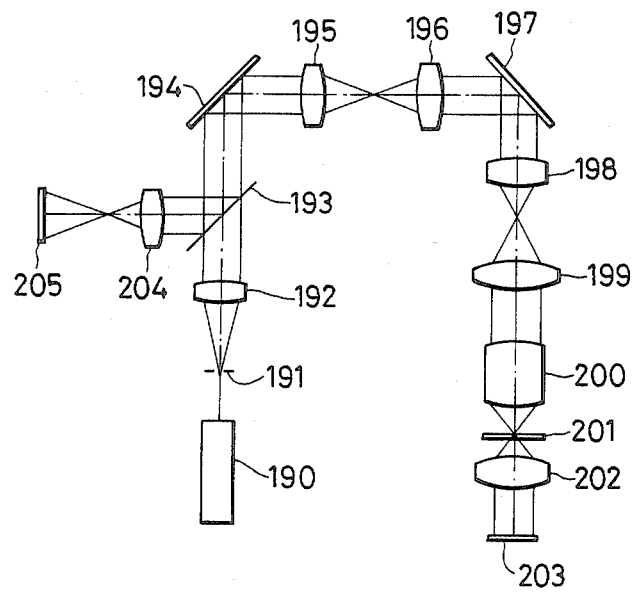
FIG. 20 is an illustration of the optical system of the microscope according to the present invention which adopts the detector shown in FIG. 18.

FIG. 20 shows the optical system of an embodiment in case the detector having the system shown in FIG. 18 is applied to the scanning type optical microscope which relies on the laser beam scanning technique. A laser beam emitting from a laser light source 190 passes through a spatial filter 191, a beam expander 192 and a beam splitter 193, and impinges onto a galvanometric mirror 194 which is set at the position of the pupil of the optical system. The galvanometric mirror 194 is a pivotal mirror for scanning the laser beam. The scanned laser beam passes through pupil relay lenses 195 and 196, and impinges onto a galvanometric mirror 197 which is set at the position of the pupil. The galvanometric mirror 197 is a pivotal mirror for scanning the laser beam. If the earlier-mentioned galvanometric mirror 194 is to undertake horizontal scanning of the image, the latter galvanometric mirror 197 will undertake vertical scanning thereof. By these two pivotal mirrors, two-dimensional scanning is performed. The two-dimensionally scanned laser beam passes through a pupil projecting lens 198 and a focusing lens 199, and impinges onto the pupil of an objective lens 200. Since this optical system is one which employs a pupil relay system as stated above, it will be noted that, even in case of off-axial beams, the laser beam keeping the information of the pupil enters the objective lens 200. And, the laser beam is rendered to a spot light by the objective lens 200, and it scans a sample 201. The laser beam which has transmitted through the sample 201 passes through a collector lens 202, and is detected by a detector 203 which is provided at the position of the pupil. Since this detector 203 is provided at the pupil position, it will be understood that, even in case of an off-axial light, there is obtained an information similar to that obtained from the on-axial light, and thus a differential image is obtained throughout the entire image.

The laser beam reflected at the sample 201 returns by following the course of its incidence, and is reflected by the beam splitter 193, and is collected once by the light-collector lens 204, and thereafter it is detected by the detector 205. The light-collector lens 204 is not always necessary. However, once the beam is collected by this collector lens 204, there may be provided, in such a manner as described already, a pin-hole or a black dot-like light-blocking item at the position to which the light is collected, whereby it is possible to observe either a focused common image or a dark field image. The detector 205 becomes equivalent to the instance where it is placed at the position of the pupil, and allows an off-axial light to be handled equally as an on-axial light.

Figure 21:
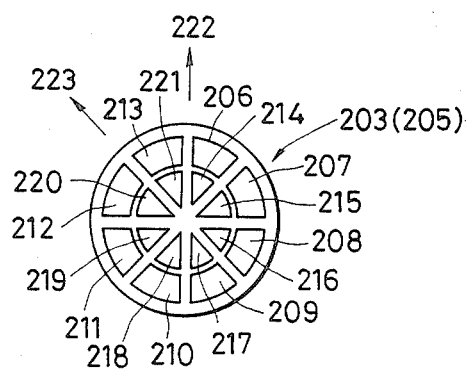
FIG. 21 is a front view of the detector which is employed in the embodiment of FIG. 20.

The detectors 203 and 205 are each comprised of sixteen photo-electric converters $206 \sim 221$ as shown in FIG. 21. By appropriately selecting them, it is possible to alter the orientation of differentiation. If the outputs of these respective converters $206 \sim 221$ are assumed to be $I_{206} \sim I_{221}$, respectively, it will be noted that, by the mathematical operation $(I_{206}+I_{207}+I_{208}+I_{209}+I_{214}+I_{215}I_{216}+I_{217})-(I_{210}+I_{211}+I_{212}+I_{213}+I_{218}+I_{219}+I_{220}+I_{221})$, the interface will assume an orientation 222. Also, by the mathematical operation $(I_{213}+I_{206}+I_{207}+I_{208}+I_{221}+I_{214}+I_{215}+I_{216})-(I_{209}+I_{201}+I_{211}+I_{212}+I_{217}+I_{218}+I_{219}+I_{220})$, the interface will assume an orientation 223. Also, by using only those signals delivered from the convserters $206 \sim 213$ which are disposed on the outer circumference region of the converter, stressing of the edge portions of the image can be accomplished. Also, the signals generated from the detectors are inputted into a frame memory not shown in synchronism with the galvanometric mirrors 194 and 197, and they are indicated as an image on the CRT, as described already.

As stated above, only by an appropriate selection of the photo-electric converters, it is possible to easily alter the differential orientation of the image.

FIGS. 22A to 22E show various modifications of the detector.

Figure 22A:
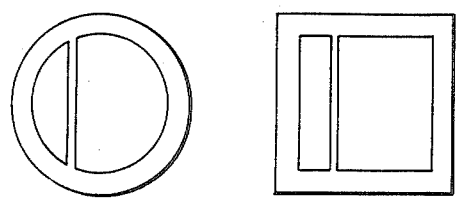
FIGS. 22A, 22B, 22C, 22D and 22E are illustrations showing various modifications of the detector.

FIG. 22A shows an example of the detector wherein the interface between the converters does not contain the optical axis. In case such a detector is disposed at the focal position, it is possible to detect a focused image having a common amplitude with the differential image, in their superimposed state.

Figure 22B:
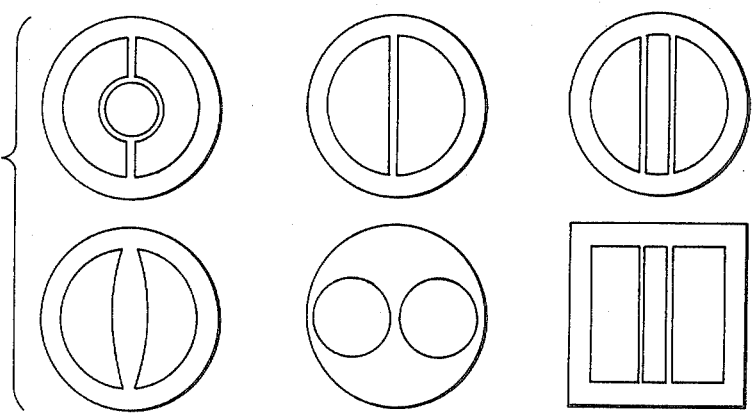

FIG. 22B shows another example of the rotary type detector.

Figure 22C:
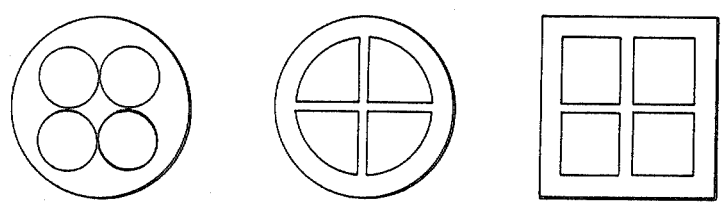

FIG. 22C shows an example which provides an elevated precision of detection by considering the realization of easy manufacture of the detector because actual photo-electric converters are required to have a very small size.

Figure 22D:
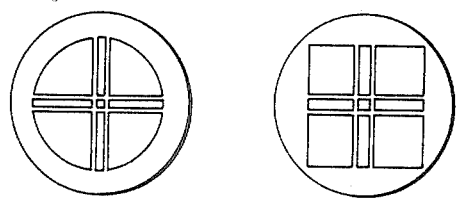

FIG. 22D shows an example such that, by providing the interface with a sufficient width and by disposing photo-electric converters also at this interface, it is made possible to obtain a sufficient interface at the time of detecting a differential image, and in addition, at the time of detecting an ordinary image, the converters which are provided at the interface are also utilized to make an efficient use of the light which is to be detected.

Figure 22E:
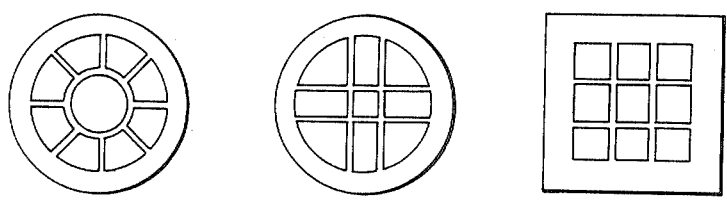

FIG. 22E shows an example wherein the converting device is finely individually specialized to allow various differentiations to be made by appropriate selection of the devices, and also wherein the light to be detected can be effectively utilized also at the time of an ordinary image detection.

Figure 23:
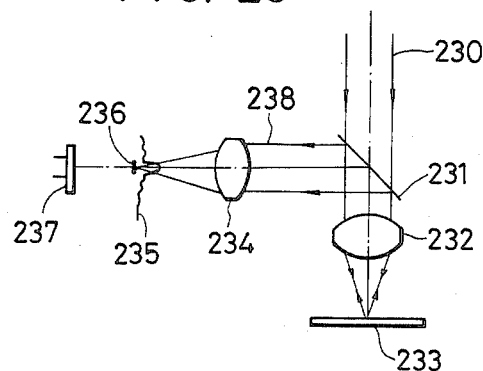
FIG. 23 is an illustration showing a first system of the dark field microscopy in the scanning type microscope according to the present invention.

It has been described already that, by placing a black dot-like light-blocking item at the position where the light is collected, a dark field image can be observed. However, description will hereunder be made in detail with respect to this matter. FIG. 23 is an illustration showing the optical system for explaning a certain system of dark field microscopy in the scanning type optical microscope which has been described already. That is, in FIG. 23, a beam 230 emitting from a laser light source passes through a beam splitter 231 and an objective lens 232, and is collected onto a sample 233. The light reflected and scattered at the sample 233 (i.e. the detection beam 238) passes through the objective lens 232 and the beam splitter 231, and is collected by a light collector lens 234 to form a spot image 235. The 0-order diffraction light contained in the spot image 235 or the light contained in its central portion is removed by a light-blocking plate 236, and the resulting light is detected by a detector 237 which is provided rearwardly thereof. A concrete example of the optical system which adopts this system is shown in FIG. 8.

Figure 24:
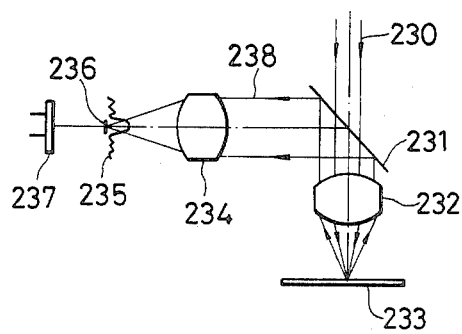
FIGS. 24 and 25 are illustrations showing a second and a third system, respectively, of the dark field microscopy in the scanning type microscope according to the present invention.

FIG. 24 is an illustration showing a second system. This is an instance that the diameter of the detection beam 238 is greater than that of the laser beam 230.

Here, it should be noted that, in FIGS. 23 and 24, the light-blocking plate 236 desirably has a size which is either equal to or greater than the size of an airy disk.

Figure 25:
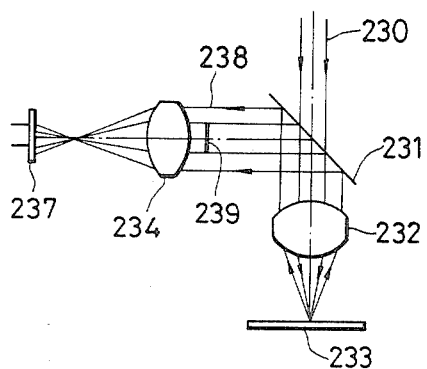

FIG. 25 is an illustration showing a third system. This is an example that, among the detection beam 238 which is reflected or scattered at the sample 233, the component of light which is reflected directly by the sample 233 is removed by a light-blocking plate 239. In this instance, the light-collector lens 234 is not always necessary.

As stated above, by the provision of means (light-blocking plate) for removing, from the detection light, the O-order diffraction light component of the detection light, i.e. the direct reflection light coming from the sample, it is possible to realize, at a low cost, a dark field microscope in the scanning type optical microscope.

As stated above, the scanning type optical microscope according to the present invention is such that, by the adoption of the system to scan a light beam, it has a high resolving power, and along therewith owing to the disposition of both the optical system and the detector in which the pupil is taken into consideration, it is possible to easily obtain such special microscopic images as differential image, high-resolution image and dark field image. Also, an interference microscope, a deflection microscope and a fluorescence microscope can be constructed by the use of only a limited number of optical parts, unlike the case of ordinary microscopes.

Furthermore, the special microscopy which is used by ordinary microscopes can be used. Also, such physical phenomena as the detection of an optically-excited electric current can be imaged. Also, it is possible to realize such fine processing as the formation of a hole in a cell. Further, by the use of an acousto-optic deflector to serve as a light-deflecting member, a laser beam scanning which is comparable to the scanning speed in TV is made feasible.

As the light deflecting member, there may be used various kinds of deflectors such as a prism and a glass block, in addition to a mirror and an acousto-optic deflector.

Also, in the above descriptions, there have been shown examples of the light scanning type which scan a laser beam. However, it is needless to say that, with respect to the dark field microscopic system, the laser beam may be applied also to the scanning type microscope of the kind which uses a fixed laser beam and the stage is scanned.

What is claimed is:

1. A two-dimensional scanning photo-electric microscope comprising:
    a light source,
    an objective lens for collecting light emitted from said light source onto an object to be observed;
    light deflecting means disposed between said light source and said objective lens for deflecting light in a direction in which light coming from said light source travels and altering the angle of incidence of light entering into said object lens to thereby scan said object with the light,
    said light deflecting means being disposed at one of a position including at a pupil position of said objective lens, at a position conjugate with said pupil position, and at a position located in the vicinity of these positions; and
    a detecting optical system including photo-electric converting means which is a detector for receiving light coming from said object,
    said photo-electric converting means being split by at least one interface so that a signal of a difference between output signals delivered from respective regions separated by said interface is determined by calculation to enable a differential image signal to be obtained.

2. A two-dimensional scanning photo-electric microscope according to claim 1, in which:
    the light coming from said object is introduced to said photo-electric converting means through said objective lens.

3. A two-dimensional scanning photo-electric microscope comprising:
    a light source;
    an objective lens means disposed between said light source and said objective lens for deflecting light in a direction in which light coming from said light source travels and altering the angle of incidence of light entering into said objective lens to thereby scan said object with the light,
    said light deflecting means being disposed at one of a position including at a pupil position of said objective lens, at a position conjugate with said pupil position and at a position located in the vicinity of these positions, and
    a detecting optical system including photo-electric converting means which is a detector for receiving light transmitted through said object and a light collecting lens for introducing light coming from said object to said photo-electric converting means,
    said photo-electric converting means being disposed either at one of a position including conjugate with a pupil position of said objective lens, with respect to said light collecting lens, and at a position located in the vicinity of said conjugate position.

4. A two-dimensional scanning photo-electric microscope according to claim 3, in which:
    said photo-electric converting means is split by at least one interface so that a signal of a difference between output signals delivered from respective regions separated by said interface is determined by calculation to enable a differential image signal to be obtained.

5. A scanning type optical microscope according to claim 1 or 4, in which:
    the orientation of said interface is variable.

6. A scanning type optical microscope according to claim 1 or 4, in which:
    said detector is split symmetrically relative to said interface.

7. A scanning type optical microscope according to claim 1 or 4, in which:
    said detector is split asymmetrically relative to said interface.

8. A two-dimensional scanning photo-electric microscope according to one of claim 1 or 5, in which:
    said photo-electric converting means is further split into two regions of an inside and an outside by an interface so that edge portions of an image can be stressed only by output signals delivered from said outside regions.

9. A two-dimensional scanning photo-electric microscope according to claim 1, 3 or 4, in which:
    a barrier filter for obtaining a fluorescence image is provided to be capable of being inserted into and removed from an optical path in front of said photo-electric converting means.

10. A two-dimensional scanning photo-electric microscrope according to one of claim 1, 3 or 4, in which:
said light source is a laser light source emitting linearly polarized light and a polarizing plate is provided to be capable of being inserted into and removed from an optical path in front of the photo-electric converting means of said detecting optical system so that a polarizing microscope image is realized when said polarizing plate is inserted into the optical path.

11. A scanning type optical microscope according to claim 1, 2, 3 or 4, further comprising:
image processing and indicating means connected to said detector to allow observation of the image of said object.

12. A two-dimensional scanning photo-electric microscope according to claim 1 or 3, in which:
light-blocking means is disposed to be capable of being inserted into and removed from an optical path at a position where the light coming from said object is collected in said detecting optical system so the O-order diffraction light coming from said object is eliminated when said light-blocking means is inserted into the optical path.

13. A two-dimensional scanning photo-electric microscope according to claim 1 or 3, in which:
pin-holes are provided to be capable of being inserted into and removed from an optical path both at a light-collecting position of said detecting optical system and at a position conjugate with said object in the rear of said light source, said pin-holes being simultaneously inserted into the optical path both at the positions to thereby form a confocal system.

14. A scanning type optical microscope according to claim 13, further comprising:
a reflecting mirror disposed in association with said detecting optical system to make it possible to reflect a light coming from said light source to overlap a light coming from said object to thereby obtain an interference fringe.

15. A two-dimensional scanning photo-electric microscope according to claim 1 or 4, in which:
said photo-electric converting means comprises two photo-electric converting elements and a prism mirror is arranged at a light-collecting position of said detecting optical system and divides light coming from said object into two rays so that the one is introduced to one photo-electric converting element and the other to another photo-electric converting element.

16. A two-dimensional scanning photo-electric microscope according to claim 1 or 3, in which:
said light source comprises a plurality of laser light sources emitting at least one of light beams of colors R (red), G (green) and B (blue) so that an optical system for synthesizing the light beams emitted from respective laser light sources is arranged between said laser light sources and so that a color separating optical system for separating the light beam coming from said object into said three colors R, G and B is arranged in the rear of the pin-hole of said detecting optical system, and said photo-electric converting means is provided with three photo-electric converting elements for receiving the separated light beams of respective colors R, G and B.

17. A two-dimensional scanning photo-electric microscope according to claim 1 or 3, in which:
a reflecting member is provided in the rear of an acousto-optic deflector so that an optical axis of a light beam incident on said acousto-optic deflector is perpendicular to that of a light beam reflected by said reflecting member.

18. A two-dimensional scanning photo-electric microscope according to claim 1 or 3, in which:
a converter lens capable of varying a flux of light is provided in the rear of said light source.

19. A scanning type optical microscope according to claim 1 or 3, further comprising:
a visual observation optical system removably provided between said light deflecting means and said objective lens.

20. A scanning type optical microscope according to claim 1 or 3, in which:
a pupil projecting lens is interchangeably disposed between said light deflecting means and said objective lens.

21. A scanning type optical microscope according to claim 20, in which:
said pupil projecting lens is a zoom lens.

* * * * *